May 19, 1959 M. J. MACKRIDGE 2,887,251
MEANS FOR THE TRANSPORTING OF THERMOPLASTIC MATERIALS IN BULK
Filed Oct. 24, 1956 3 Sheets-Sheet 1

—FIG.1.—

INVENTOR
Muir James Mackridge
BY
*Shoemaker & Mattare*
ATTORNEYS

# United States Patent Office 2,887,251
Patented May 19, 1959

2,887,251
MEANS FOR THE TRANSPORTING OF THERMOPLASTIC MATERIALS IN BULK

Muir James Mackridge, Manchester, England, assignor to Technical Waxes Limited, Manchester, England, a British company Application October 24, 1956, Serial No. 618,136

2 Claims. (Cl. 222—131)

This invention relates to means for the transporting of bulk materials which have a relatively low melting point, say from 50°–200° C.

Instances of the use of the invention are in the transport of paraffin wax, microcrystalline wax, bitumen, synthetic rubbers, resins, synthetic resins, and other raw chemicals, and compounds of all the aforementioned which at normal atmospheric temperatures are in the solid state, but which must be melted into a liquid before they can be used in various industrial processes or for a variety of manufacturing purposes.

Such chemicals or preparations are usually transported in bags or blocks which not only necessitates labour in moulding to a size which can readily be handled, but also involves costs of packing materials.

The object of the present invention is to reduce substantially the intermediate melting operations and reduce packing and transport costs.

According to this invention, a container is provided into which the materials may be put in a molten state and if desired allowed to solidify or gel, said container being adapted for transport by road or rail vehicle or otherwise and including within itself heating means and draining means so that during transport and/or upon the arrival at the intended destination the material may be melted, or if still fluid brought to a predetermined higher temperature, and drained off as and when required through the said draining means.

Conveniently the improved transport means comprises a lagged metallic container of parallelepiped form, but having the floor or bottom inclined. Valve-controlled draining means is provided at the lower end of this inclined face so that when the material is molten and the draining means is open the complete contents of the container may be run out.

The heating means may comprise electrical strip elements or conduits for connection with a steam system or otherwise.

According to a further feature of the invention, the lower part of the container is provided with guides to receive the forks of a lift truck, and such guides may be in the form of inverted channel members, or may comprise apertures in depending end walls of the container, or may be otherwise provided. Preferably, the container is mounted on legs or feet to enable same to be lifted either by a fork lift truck or a platform or pallet truck.

The invention will now be described in more detail with reference to the accompanying drawings, wherein.

Figure 1:
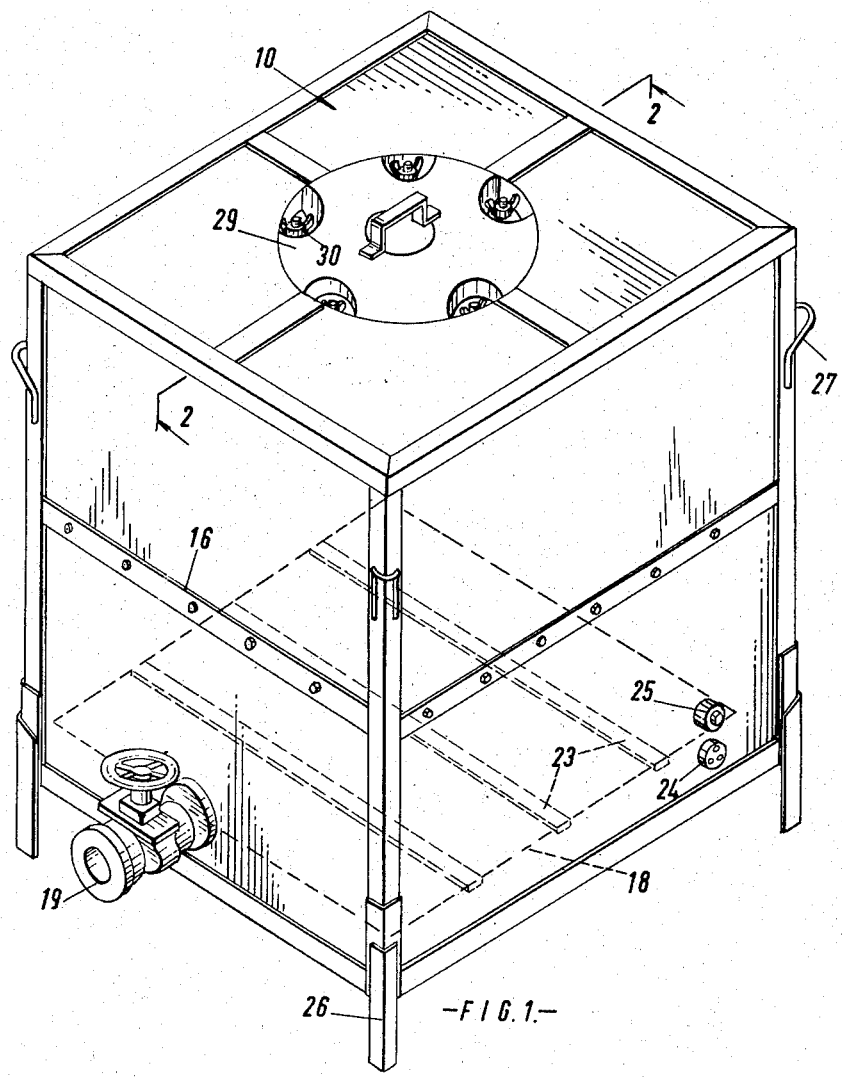
Fig. 1 is a perspective view of one example of container constructed according to the invention.
Figure 2:
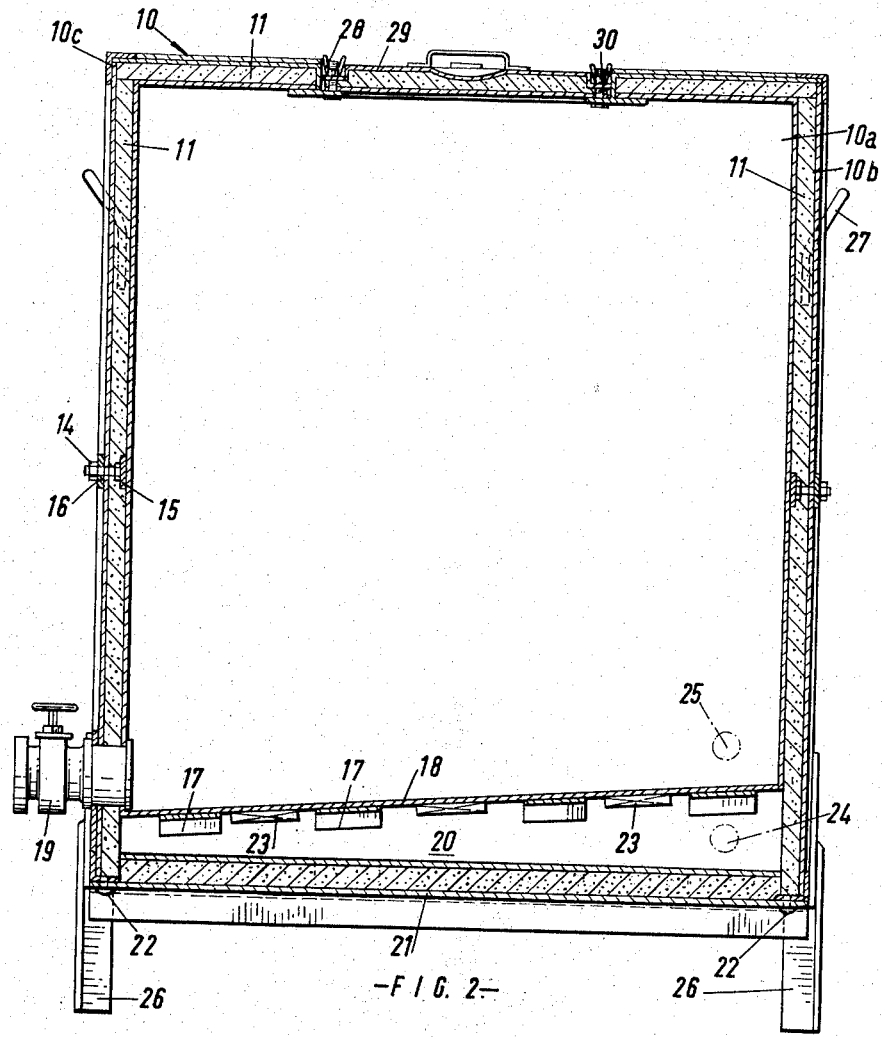
Fig. 2 is a section on the line 2—2, Fig. 1.

In the example illustrated in Figs. 1 and 2, the container 10 comprises inner and outer vessels 10a, 10b of sheet metal and of such dimensions as to provide a cavity between the walls packed with suitable lagging material 11 to reduce heat losses. The outer vessel is made rigid by angle members 10c at each corner. The interior of the container may be strengthened by internal struts, not shown, and the vertical inner and outer side walls are interconnected and stiffened by studs or bolts 14 extending between horizontal support members 15, 16. The inner vessel 10a is supported within the outer vessel or casing by cross-members 17 attached to the inner face of two opposed side walls of the outer vessel 10b, and the floor 18 of said inner vessel is inclined towards a runoff valve 19 provided in one side face at the lower end of the floor, or an additional valve may be provided in the other side face or elsewhere.

An air gap 20 is provided between the inclined floor 18 of the inner vessel and the base closure member 21 of the outer vessel or casing, said member being removably fixed in place by bolts 22 to facilitate access to the electrical strip heating elements 23 in the inclined floor 18. Suitable electrical connections to a source of electrical supply are provided at 24, whereby the contents of the container can be heated or re-heated under the control of a thermostat 25 either whilst standing in the works or factory, or during transport where electrical power is available. Alternatively, electrical immersion heaters may be provided, or a steam coil 32 (see Fig. 3) might be fitted in lieu of the electrical heaters, so that the container contents can be heated cheaply when steam is available.

The container is provided with legs 26 which raise it off the floor to a sufficient height to allow the insertion of the forks or platform of a lifting truck. In addition, the container is also provided with eyes 27 to enable it to be lifted by crane.

Filling of the container is effected through a lagged man hole 28, the cover 29 of which is secured by suitable fastening means such as bolts 30.

The external dimensions of the container are approximately 4' long, 3' wide and 4' in height, and it is adapted to hold approximately 15 to 17 cwts. of wax or other material.

In use, the container is filled with the liquid material at the place of manufacture, and may be stored at any predetermined temperature until transported to the place of use, where it is positioned so that it can deliver through the valve into a machine. In practice, it has been found that the construction and lagging of the container are such that the liquid material will not solidify for some time, anything up to 2 days, thus enabling the containers to be transported for considerable distances without solidifying. In cases where the bulk material is transported only a comparatively short distance, the material can soon be brought to the required temperature ready for use and the run-off valve connected direct to the machine or other apparatus so that no transfer of the material from one container to another is ever necessary once the container has been filled.

After being emptied, the container is returned to the source of supply for re-filling.

The container may be provided with temperature indicating means, and if desired agitating means may be provided within the container and operated either manually or mechanically from outside the container.

Figure 3:
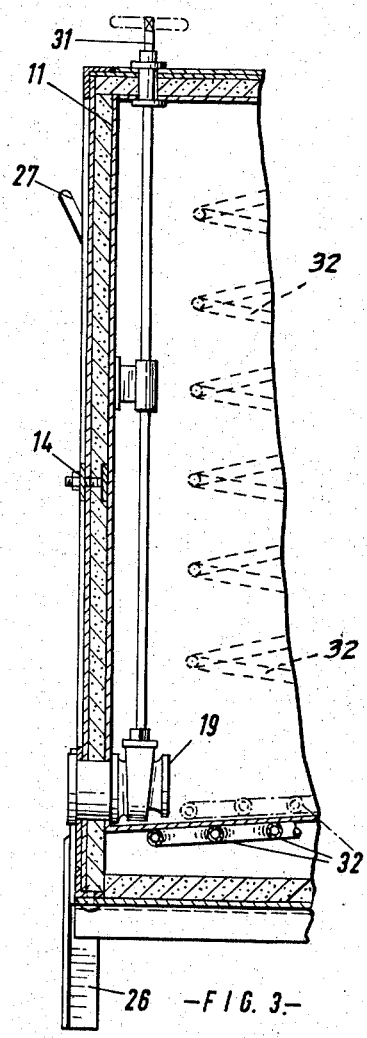
Fig. 3 is a detail view illustrating a modification.

In the modified construction illustrated in Fig. 3, the valve means may be located within the container so that it is maintained at the same temperature as the material to prevent clogging of the valve during transport or whilst in storage. In this case the valve is provided with a vertical operating shaft or rod 31 which passes upwards through the container and is operated by an external wheel located at the top of the container. Alternatively, the portion of the shaft 31 projecting from the top of the container may terminate in a squared end adapted to be engaged by a removable manipulating handle.

Obviously the container need not be of double-walled construction, but may be single-walled and thermo-insulated by any suitable material and in any suitable manner.

The containers are designed for stacking one above the other, so that considerable quantities of material can be stored and maintained at any predetermined temperature ready for use at any time.

What I claim is:

1. A transportable thermally insulated container for transporting and storing thermoplastic bulk materials having a relatively low melting point, the container being adapted to receive the bulk material in molten condition, said container having a filling orifice at the top thereof and a thermally insulated closure member for said orifice, a drain valve outlet at the bottom of said container, said container being of double-walled rectangular form consisting of an inner vessel and an outer vessel, the inner vessel having a sloping bottom inclined downwardly toward said outlet, the cavity between the double walls being packed with suitable insulating material to reduce heat losses, the inner vessel being supported by cross members attached to the outer vessel so as to provide an air space between said sloping bottom of the inner vessel and a removable closure member forming the bottom of the outer vessel, and low-energy electrical heating means, said heating means comprising electrical strip heating elements positioned within said air gap and attached to the underside of the sloping bottom of the inner vessel, said heating means including connections for connecting the heating elements to a source of electrical energy.

2. A device for transporting and storing thermoplastic materials having a relatively low melting point comprising a hollow container having upstanding side portions and a transversely extending top portion, each of said portions being of double wall construction defining cavities between said walls, the cavities between said walls being packed with heat insulating material, leg means supporting said container and being spaced from one another to permit the insertion of lifting means therebetween, a floor extending and spanning the distance between said upstanding side portions and sloping downwardly from one of said side portions to the opposite side portion, drain means mounted within and extending through said last mentioned side portion adjacent the intersection of said floor and said last mentioned side portion, said drain means providing communication with the exterior of said container, said top portion having a filling orifice formed therethrough, a removable double walled cover for sealing said orifice, the walls of said cover defining a cavity therebetween and being packed with heat insulating material, a removable closure member for closing the bottom of said container, said closure member being of double wall construction defining a cavity between the walls thereof, said last mentioned cavity being packed with heat insulating material, said closure member being spaced below said floor and defining an air gap between the closure member and the floor, and a heating element secured to the under surface of said floor and spaced from said closure member, and means for connecting said heating element to a source of heating energy.

References Cited in the file of this patent

UNITED STATES PATENTS

| | | |
|---|---|---|
| 1,015,636 | Reipp | Jan. 23, 1912 |
| 1,562,991 | Rudigier | Nov. 24, 1925 |
| 1,705,649 | Scott | Mar. 19, 1929 |
| 1,933,403 | Wilson | Oct. 11, 1933 |
| 2,291,256 | Rehrig et al. | July 28, 1942 |
| 2,686,613 | Tamminga | Aug. 17, 1954 |
| 2,726,788 | McIntosh | Dec. 13, 1955 |
| 2,746,847 | Stahl | May 22, 1956 |
| 2,808,965 | Graphia et al. | Oct. 8, 1957 |